Figure 1:
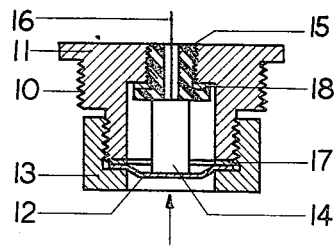

July 4, 1939.   J. J. BROEZE ET AL   2,164,638
ELECTRICAL PRESSURE DETECTOR
Filed April 8, 1938

Inventors:
Johannes Jan Broeze
Hendrik van Driel
By their Attorney:

Patented July 4, 1939

2,164,638

UNITED STATES PATENT OFFICE 2,164,638

ELECTRICAL PRESSURE DETECTOR

Johannes Jan Broeze and Hendrik van Driel, Delft, Netherlands, assignors to Shell Development Company, San Francisco, Calif., a corporation of Delaware Application April 8, 1938, Serial No. 200,972
In the Netherlands April 20, 1937

9 Claims.  (Cl. 171—327)

The present invention pertains to methods and devices for converting rapidly varying pressures, such as those occurring, for example, in internal combustion engines, into electrical effects, for the purpose of observing and measuring these effects by means of suitable apparatus, such as cathode ray oscillographs.

These methods generally involve the use of a pressure detector, that is, of a device comprising a metallic or elastic wall or diaphragm, subjected to the effect of the pressures to be measured, and of an electric element capable of generating electrical impulses in response to the motion or pressure of said elastic wall. This electric element may, for example, comprise an electrical resistance having a value varying as a function of the mechanical pressure applied thereto, a condenser, a piezo-electric crystal or a plurality of such crystals, etc.

Although many systems have already been developed to effect measurements by means of said devices, it has been found that the accuracy of these systems is as a rule unfavorably affected by the inertia effects of the pressure detector.

In the first place, the inertia of the pressure-sensitive part of the pressure detector may be so great, or, in other words, its natural frequency so low, that the deflections resulting from rapidly varying pressures become greater owing to the proximity of a resonance range. In the second place, sudden accelerations of the cylinder wall in which the pressure detector is secured, are sometimes reproduced by the latter as pressure effects because of the mass action of the pressure-sensitive part, the detector thus acting as a seismograph.

Finally, there are parts in pressure detectors which undergo deformation owing to the varying pressures, these deformations being accompanied by minute relative frictional movements between the parts, the resulting minute shocks causing the detector to vibrate at its natural frequency. In this respect, parts having contacting surfaces not at right angles to the direction of pressure, such as guide members or screw-threads in those portions of the device, which are under a varying load, have an especially unfavorable effect, leading in many cases, for example, in a detonating gasoline engine, to a complete distortion of the pressure variation image.

In many known types of pressure detectors, an elastic wall or diaphragm is employed on which the pressure to be observed is acting and which is partly supported by the element, such as a piezo-electric crystal, in which the pressure or displacement of the diaphragm is converted into an electrical effect. Said element is usually held in pressed position against the elastic wall by means of an adjustable screw or nut, there being sometimes interposed sleeves, bolts and other intermediate parts. These adjusting devices are the cause of a considerable part of the undesirable vibrations, since they have relatively large masses and cannot be regarded as perfectly fixed under all circumstances, being tightened only by relatively small forces.

Furthermore in pressure detectors of the conventional type, it has been hitherto found impossible to apply the displacement pressure of the elastic wall directly to the element generating the electric impulses, due to the fact that said elastic wall deflects along a curved line or plane, whereas the electrical element requires, in order to avoid incorrect reproduction of pressures or cracking of such delicate elements as piezo-electric quartz crystals, that the pressure be uniformly transmitted to said crystal in a flat plane parallel to the face of said crystal and perpendicular to the direction of the pressure. Intermediate transmission members have therefore been commonly interposed between the elastic wall and the electric element, whereby the surface supporting the piezo-electric crystals, or the plate of an electric condenser remained flat under any conditions. These intermediate members, however, due to the vibration and friction effects described above, often considerably impaired the accuracy of the device.

When quartz is used as the piezo-electric element, two or more crystals are commonly used, whereby the insulation of the live part is effected, while the electrical effect is doubled or multiplied. These quartz crystals are cut in definite directions and are generally turned off to a cylindrical form. One or both of these cylinders is usually hollow and serves as a lead-in to the insulated conductor carrying the electrical impulses. These cylinders must satisfy the following conditions: they must be properly centered; the surfaces on which the crystals rest must be accurately machined, and the diameter of the cylinders should be as small as possible, for example, of the order of 6 mm., while the casing surrounding the pressure detector should have a local external diameter not exceeding 14 mm.

It is therefore the object of this invention to provide a pressure detector which would satisfy all of the above conditions and in which the undesirable frictional vibration effects referred to above would be substantially eliminated due to a suitable arrangement of metallic or metallized parts wherein contacting surfaces are caused to adhere to each other in such a manner as to form a unitary elastic structure free from the relative motion of said parts, the various parts forming the casing of the detector being locked together under a tightening pressure substantially in excess of that applied to the electrical element.

It is another object of this invention to provide a pressure detector comprising a diaphragm or an elastic wall cooperating directly with the electrical impulse generating element, said wall being provided with a flat thickened portion which is not subjected to deformation under the action of the outside pressure.

It is another object of this invention to provide a pressure detector wherein all parts that have to be machined with great accuracy are readily accessible and are capable of having their contacting surfaces ground truly flat. It is another object of this invention to provide a pressure detector wherein an electrical element of maximum size can be used for a given size of the detector casing.

The present invention will be understood from the following description taken with reference to the attached drawing, wherein Figures 1 to 6 give diagrammatic cross-section views of several preferred embodiments of the device of the present invention.

Referring to Fig. 1, the present pressure detector comprises a casing 11, adapted to be affixed, for example, by means of screw-threads 10, within a suitable orifice in the cylinder wall of an internal combustion engine. An elastic wall or diaphragm 12 is secured to said casing, for example, by means of a nut 13 in a pressure-tight manner. The pressure is partly taken up by the casing, and partly by an element 14 which is able to convert variations in pressure or lengths into electrical effects, and which is held between said elastic wall and an insulating plug 15, inserted into the casing.

The member 14 is electrically grounded at one end, and is connected at the other end to an insulated wire 16, passing through plug 15 and adapted to transmit the electric impulses generated by the element 14 to a suitable amplifying and registering apparatus. The initial tension or pressure of the elastic wall 12 on the element 14 is not obtained by means of an adjusting screw but by giving the element 14 a correct size or axial length with respect to the depth of the chamber formed within the casing 11. This arrangement, while preventing the possibility of continuous adjustments once the pressure detector is assembled, has the advantage of eliminating the main source of undesirable vibrations referred to above. The correct initial adjustment may be effected, for example, by testing the pressure detector with known pressures, and varying the tension of the diaphragm 12 by means of blind washers 17 and 18 of varying thickness, inserted between the casing 11 and the diaphragm 12 and/or between the casing 11 and insulating plug 15 respectively. It is essential that blind washers be provided only at such places where they can be held under high pressures in order that any relative frictional motion of the parts be eliminated. Thus, the diaphragm 12 or the plug 15, holding the washers 17 and 18, can be tightened up with regard to the casing 11 with a force of 1000 to 5000 kg., while the pressure between diaphragm 12, element 14 and plug 15 is usually only about 50–100 kg. if the outside dimensions of the pressure detector are of the order of 14 mm.

Figure 2:
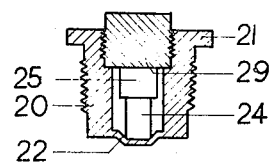

Fig. 2 shows another preferred embodiment of the present invention, wherein the elastic wall or diaphragm 22 is an integral part of the casing 21, the electrical element 24 being pressed between said diaphragm and a plug 25, which is held in place by means of a collar 29 under a very high tightening pressure with regard to the casing 21, while the electrical element 24 is subjected only to a relatively small pressure.

Since no readjustments during operation are necessary with the devices of Figs. 1 and 2, riveting, shrinking, welding, brazing or flanging may be substituted for the screw-thread connections shown in these figures. If piezo-electric crystals are used as electrical elements, the contact faces of these crystals may be metallized in a manner known to the art.

Figure 3:
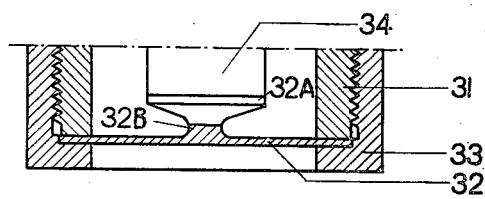
Figure 3A:
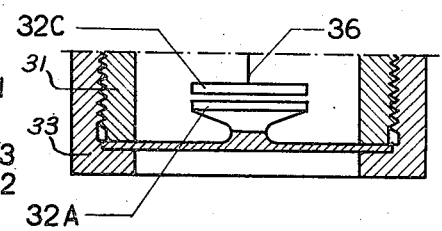

Fig. 3 shows another embodiment of the casing of the present detector, wherein provision is made to prevent any deformation of that portion of the pressure face of the elastic wall which acts upon the pressure responsive element 34. In this type of pressure detector, the elastic wall 32 carries in its central portion a table 32A provided with a flat accurately machined upper face, which table is secured to the wall through a constricted or undercut portion 32B of reduced cross-section. When, in response to the pressures developed in an internal combustion engine cylinder and applied to the underside of the elastic wall 32, said wall moves or vibrates, assuming in motion a somewhat bent or arcuate shape, the table 32A follows the motion of said wall without being subjected to any deformation due to bending of the diaphragm, its upper face remaining flat, and the pressure being thereby transmitted to the electrical element 34 in a flat plane perpendicular to the direction in which the pressure acts. The electrical element 34 may consist of a piezo-electric element such as a quartz crystal cylinder, as shown in Fig. 3, or of a condenser, as shown in Fig. 3A, the table 32A forming the movable plate of said condenser, and the stationary plate, diagrammatically shown at 32C in Fig. 3A, being suitably supported within the casing 31.

Figure 4:

Fig. 4 shows still another embodiment of the present casing, which stands in the same relationship to that of Fig. 3, as the device of Fig. 2 stands to Fig. 1, the elastic wall 42 being formed as a whole with the casing 21. Since, with this construction, it is difficult to machine a recessed or undercut thickened table portion such as shown in Fig. 3, the diaphragm of the device of Fig. 4 is provided with a circumferential portion 42B of relatively very small thickness, and with a thickened portion 42A, corresponding to the table 32A of Fig. 3. This thickened portion being centrally located within the casing 41, can be easily ground to an accurately flat surface.

Figure 5:
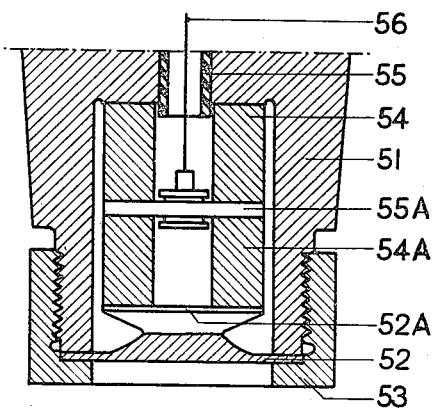

Fig. 5 shows a pressure detector comprising two hollow piezo-electric cylinders 54 and 54A of opposite polarity, one end of each of said piezo-electric cylinders being electrically grounded through the metallic parts of the casing, and the other ends of said cylinders, of like polarity, being in contact with a metallic plate 55A, electrically connected, by means of a suitably insulated conductor 56, with a suitable electrical-indicating device, whereby the piezo-electric effect of the detector is doubled. These two cylinders are centered within the detector as follows: the upper cylinder 54 is first centered by means of a tube 55, which may, if desired, be made of an insulating material and is adapted to enter the bore of the upper hollow cylinder. A metallic contact member 55A provided on either side with suitable projections adapted to enter the bores of the hollow cylinders is then centered with regard to the upper cylinder 54, and the lower cylinder 55A is centered by means of this contact member 55A. The thickness of the contact member 55A may be adjusted during preliminary tests in such a manner as to keep the piezo-electric cylinders under a desired compression. The diaphragm 52, which may be provided with the thickened tubular central portion 52A is centered and tightened in the usual way with regard to the casing 51, but does not affect the centering of the piezo-electric cylinders.

In this manner, the bottom of the casing 51 and the supporting face 52A of the diaphragm can be accurately machined prior to assembling the detector. Furthermore, this arrangement permits the use of piezo-electric cylinders of maximum possible external diameter with regard to a minimum possible internal diameter of the bore forming the chamber within the casing 51, only a very narrow air space clearance being left therebetween. This method of centering is of great importance when the casing and the elastic wall are made in one piece, since only the pressure face located in the lower end of the casing, which need not contribute in the centering, has to be ground truly flat.

Figure 6:
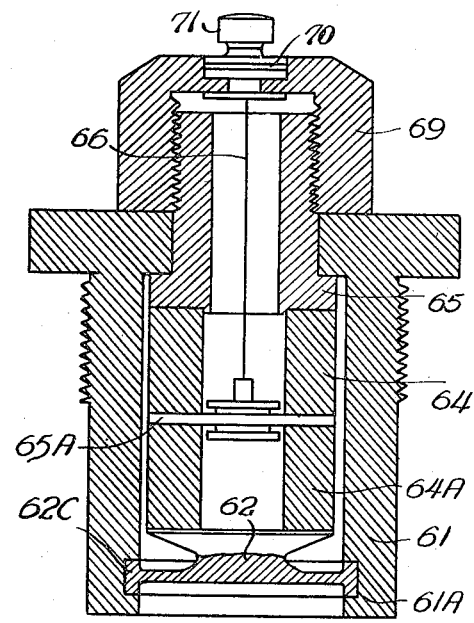

Fig. 6 shows a pressure detector similar to that of Fig. 5, in which the diaphragm 62, crystals 64 and 64A whose faces may be metallized for contact purposes, contact member 65A and plug 65 are united as a whole by brazing before being placed within the casing 61, whereafter the lower edge 61A of the casing 61 is bent over the thickened edge 62C of the elastic wall as shown in Fig. 6, or the two parts are connected by welding or brazing. The nut 69 for securing the plug 65 with respect to the casing 61 is provided with an insulating member 70 having a terminal 71 for the wire 66 leading from the contact member.

It is understood that the embodiments of Figs. 5 and 6 may be modified in any desired manner, for example, by substituting the plates of a condenser for the crystal cylinders 54, 54A, 64 and 64A, the plates being separated by a layer of dielectric material, for which air may be used advantageously.

We claim as our invention:

1. In an electrical pressure detector, a cylindrical metallic casing open at one end, a relatively thin diaphragm closing said opening, the outside face of said diaphragm being exposed to the pressures to be measured, said diaphragm having a considerably thickened central portion capable to remain free of distortion when the diaphragm is subjected to outside pressures, an electrical element capable of converting mechanical pressure into electrical effects, said element being held within said casing in contact with and under compression by said diaphragm, means locking said diaphragm with the casing, the tightening pressure between said means and the casing being substantially in excess of that applied to the electrical element, and an insulated conductor passing through the casing and connected to said electrical element.

2. In the device of claim 1, a diaphragm having a central portion thickened and undercut on the inner side of the diaphragm, said portion having an inside face capable of remaining substantially flat when the diaphragm is subjected to pressures applied to its outer side.

3. In an electric pressure detector, a cylindrical metallic casing open at one end, a diaphragm adapted to form one of the walls of said casing, said diaphragm being exposed to the pressures to be measured, an electrical element capable of converting mechanical pressure into electrical effects, said element comprising at least two cylindrical piezo-electric crystals and a metallic contact member interposed therebetween, said element being held within said casing in contact with and under compression by said diaphragm, locking means to close said casing, said means being held under a tightening pressure substantially in excess of that applied to the electrical element, and an insulated conductor passing through the casing and connected to said contact member.

4. In an electrical pressure detector, a cylindrical metallic casing open at one end, a diaphragm closing said opening, said diaphragm being exposed to the pressures to be measured, an electrical element capable of converting mechanical pressure into electrical effects, said element comprising at least two cylindrical piezo-electric crystals and a metallic contact member interposed therebetween, said element being held within the casing in contact with and under compression by said diaphragm, means locking said diaphragm with the casing, the tightening pressure between said means and the casing being substantially in excess of that applied to the electrical element, and an insulated conductor passing through the casing and connected to said contact member.

5. In an electrical pressure detector, a cylindrical metallic casing open at one end, a diaphragm closing said opening, said diaphragm being exposed to the pressures to be measured, an electrical element capable of converting mechanical pressure into electrical effects, said element comprising at least two hollow cylindrical piezo-electric crystals and a metallic contact member interposed therebetween, projections on said member adapted to enter the bore of the hollow crystal cylinders, an axial bore through the closed end of the casing, a tubular member extending therethrough and adapted to enter the bore of one of said cylinders, said electrical element being held within the casing in contact with and under compression by said diaphragm, means locking said diaphragm with the casing, the tightening pressure between said means and the casing being substantially in excess of that applied to the electrical element, and an insulated conductor passing through the casing and connected to said contact member.

6. In the device of claim 5, a diaphragm having a central portion thickened and undercut on the inner side of the diaphragm, said portion having an inside face capable of remaining substantially flat when the diaphragm is subjected to pressures applied to its outer side.

7. In an electrical pressure detector, a cylindrical metallic casing open at one end, a diaphragm closing said opening, said diaphragm being exposed to the pressures to be measured, an electrical element capable of converting mechanical pressure into electrical effects, said element comprising at least two hollow cylindrical piezo-electric crystals and a metallic contact member interposed therebetween, projections on said member adapted to enter the bore of the hollow crystal cylinders, an axial bore through the closed end of the casing, a tubular member extending therethrough and adapted to enter the bore of one of said cylinders, said electrical element being held within the casing in contact with and under compression by said diaphragm, means locking the tubular member with the casing, said means being under a tightening pressure substantially in excess of that applied to the electrical element, and an insulated conductor passing through the tubular member and connected to the contact member.

8. In an electrical pressure detector a cylindrical metallic casing, a diaphragm closing said casing at one of its ends, the outside face of said diaphragm being exposed to the pressures to be measured, said diaphragm having a considerably thickened central portion with a flat inside face capable of remaining substantially flat when the diaphragm is subjected to outside pressures, an insulated plate connected to the casing so as to lie opposite to the said face and to form an electrical condenser with the central portion of the diaphragm, and an insulated conductor passing through the casing and connected to said plate.

9. In the device of claim 8 a diaphragm having a central portion thickened and undercut on the inner side of the diaphragm.

JOHANNES JAN BROEZE.
HENDRIK van DRIEL.